US012321817B2

(12) United States Patent
Yepez et al.

(10) Patent No.: US 12,321,817 B2
(45) Date of Patent: Jun. 3, 2025

(54) PORTABLE SCAN-ASSISTANCE DEVICE

(71) Applicant: NCR Voyix Corporation, Atlanta, GA (US)

(72) Inventors: Rafael Yepez, Duluth, GA (US); Shelby Frances Apps, Atlanta, GA (US)

(73) Assignee: NCR Voyix Corporation, Atlanta, GA (US)

(*) Notice: Subject to any disclaimer, the term of this patent is extended or adjusted under 35 U.S.C. 154(b) by 49 days.

(21) Appl. No.: 17/536,225

(22) Filed: Nov. 29, 2021

(65) Prior Publication Data
US 2023/0169286 A1 Jun. 1, 2023

(51) Int. Cl.
G06K 7/10 (2006.01)
G06K 7/14 (2006.01)
G06Q 30/06 (2023.01)

(52) U.S. Cl.
CPC ....... *G06K 7/1408* (2013.01); *G06K 7/10881* (2013.01); *G06K 7/1443* (2013.01); *G06Q 30/06* (2013.01)

(58) Field of Classification Search
CPC ............ G06K 7/10722; G06K 7/1413; G06K 7/1404; G06K 19/0723; H04W 4/80; H04W 12/06
USPC ....... 235/472.01, 454, 462.01, 462.09, 462.1
See application file for complete search history.

(56) References Cited

U.S. PATENT DOCUMENTS 10,540,700 B1  1/2020  Chilukuri
2016/0259329 A1* 9/2016 High ................. H04N 5/77
2017/0357939 A1* 12/2017 Jones ................. H02K 7/1846
2018/0165670 A1  6/2018 Bacallao
2018/0247255 A1* 8/2018 Jones ................ G06T 7/90
2019/0210849 A1* 7/2019 High ................ G05D 1/0246
2021/0327234 A1* 10/2021 Chandramowle .... G06Q 20/208

FOREIGN PATENT DOCUMENTS

EP      1542332 A1    6/2005
WO  2017/031177 A1    2/2017

OTHER PUBLICATIONS

EP Search Report—Apr. 13, 2023.
"European Application Serial 22202402.8, Communication pursuant to Article 94(3) EPC mailed May 8, 2024", 5 pgs.

* cited by examiner

*Primary Examiner* — Daniel St Cyr
(74) *Attorney, Agent, or Firm* — Schwegman Lundberg & Woessner, P.A.

(57) ABSTRACT

A portable scan-assistance device is provided. A mobile device operated by a customer establishes a connection to the scan-assistance device at the start of a shopping trip by tapping the mobile device on the scan-assistance device or by the mobile device scanning a code affixed to the scan-assistance device. A status light on the scan-assistance device illuminates a designated color (such as blue) upon successful connection. A camera/image sensor/barcode reader of the scan-assistance device captures an item code of an item placed in front of the camera and forwards the item code to a mobile shopping application on the user mobile device during the customer's shopping trip. When an item code is successfully captured the status light of the scan-assistance device illuminates a second color (such as green), otherwise the status light of the scan-assistance device illuminates a third color (such as red).

19 Claims, 3 Drawing Sheets

PORTABLE SCAN-ASSISTANCE DEVICE

BACKGROUND

As technology advances and consumers embrace it in all aspects of their lives, many retailers have taken advantage of this phenonium with technology offerings that make it easier for their customers to interact with the retailers and transaction with the retailers.

For example, most retail stores now have Self-Service Checkouts (SCOs) where customers of the stores can self-checkout. Customers utilizing SCOs typically have to pick items from the store shelves, carry them to the SCOs, scan the item barcodes at the SCOs, and pay for the goods. The problem with this approach is that the customers have to handle the items multiple times before checking out (pick from shelves, place in cart, remove from cart, scan at the SCOs, bag the items, etc.).

Consequently, many retailers now offer mobile applications accessible from their customer phones that permit their customers to scan item barcodes as they shop in the stores and place scanned items in bags of a cart or a basket. Scan as you shop applications have streamlined the customer experience within the stores. However, these applications still have a number of problems, which have limited customer adoption of this technology.

The scan as you shop applications require the user to actively operate their mobile phones as they shop. This creates a usability issue because one customer hand has to hold a picked item while the other customer hand has to operate the phone and interact with the mobile application during shopping. Many customers find this experience too cumbersome and difficult.

As a result, some retailers have developed smart carts that comprise a variety of sensors, processors, displays, and software applications (similar to the scan as you shop applications). This frees the customers from having to hold their phones while shopping and picking items, but it creates other problems for the retailers. Retailers now have to purchase and deploy fairly complex and expensive devices, which must be maintained, supported, and purchased. None of these expenses and activities were required when customers had a mobile application, which was deployed to and processed on their own phones and which could be updated and supported via a cloud through a cellular or Wi-Fi connection to the phones.

As a result, there is a need for an improved, less expensive, less complex, and more practical device with a revised customer workflow, which can maintain the existing mobile shopping applications on the customer devices without requiring the customers to operate their devices while shopping.

SUMMARY

In various embodiments, a system, a device, and methods for operating a portable scan-assistance device while shopping are presented.

According to an embodiment, a portable scan device is provided. The portable scan device comprises a status light; a wireless transceiver; an image sensor; a processor; and a non-transitory computer-readable storage medium comprising executable instruction. The executable instructions when executed by the processor cause the processor to perform operations, comprising: establishing a wireless connection with a mobile device; relaying item codes captured by the image sensor to the mobile device over the wireless connection; and controlling illumination of the status light based on statuses associated with the wireless connection and the image sensor.

DETAILED DESCRIPTION

Figure 1A:
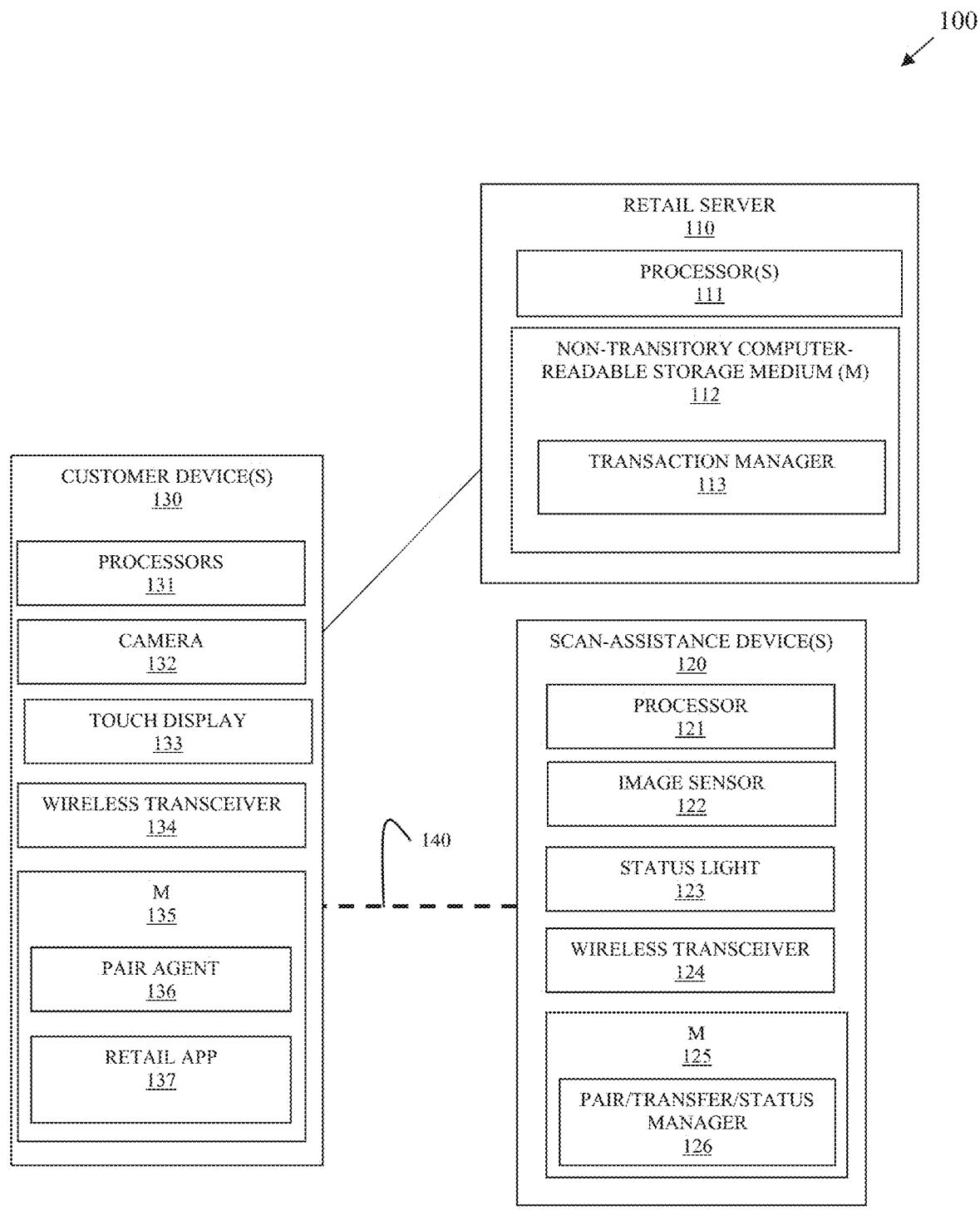
FIG. 1A is a diagram of a system for providing and operating a portable scan-assistance device while shopping, according to an example embodiment.

FIG. 1 is a diagram of a system/platform 100 providing and operating a portable scan-assistance device while shopping, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of providing and operating a portable scan-assistance device, presented herein and below.

System/platform 100 (herein after just "system 100") provides a processing environment by which customers of a retail store can shop handsfree using a portable scan-assistance device that can be attached to carts, bags, baskets, shopping scooters, or worn by the customer while shopping. The users mobile device (such as phone) establishes a connection to the scan-assistance device in an automated manner (tapping or scanning a Quick Response (QR) label affixed to the scan-assistance device. Once the customer's phone is connected to the scan-assistance device, the customer can put their phone away and shop in the store. As items are picked for purchase by the customer, the customer places the item barcode over a small camera of the scan-assistance device and the item code is read and forwarded to the customer's mobile shopping application that processes on the customers phone over a wireless connection. The mobile shopping application provides the item code to the store's server where the item information is obtained, and pricing and the item is added to a virtual cart being maintained by the server for the customer while the customer is within the store shopping. The customer can shop without operating their phone utilizing both hands while shopping, the actual shopping session is still handled by the customer phone's mobile application via a connection to the store server. Various aspects of the scan-assistance device and the workflows associated with a customer shopping session are now discussed with reference to the FIGS. 1A, 1B, and 2.

As used herein, the terms "user," "consumer," and/or "customer," may be used interchangeably and synonymously herein and below. This refers to an individual who is interacting with a portable scan-assistance during a shopping trip of the individual within a store.

The system 100 comprises a retail server 110, a scan-assistance device 120, and a customer device 130.

Retail server 110 comprises at least one processor 111 and a non-transitory computer-readable storage medium 112.

Medium 112 comprises executable instructions for a transaction manager 113. The executable instructions when provided to processor 111 from medium 112 cause the processor 111 to perform operations discussed herein and below with respect to transaction manager 113.

Each scan-assistance device 120 comprises at least one processor 121, an image sensor 122, one or more status lights 123, a wireless transceiver 124, and a non-transitory computer-readable storage medium 125. Medium 125 comprises executable instructions or firmware for a pair/transfer/status manager 126. The executable instructions/firmware when provided to processor 121 from medium 125 cause the processor 121 to perform operations discussed herein and below with respect to pair/transfer/status manager 126.

Each customer device 130 comprises at least one processor 131, a camera 132, a touch display 133, a wireless transceiver 134, and a non-transitory computer-readable storage medium 135. Medium 135 comprises executable instructions for a a pair agent 136 and a retail shopping app 137. The executable instructions when provided to processor 131 from medium 135 cause the processor 131 to perform operations discussed herein and below with respect to 136 and 137.

Figure 1B:
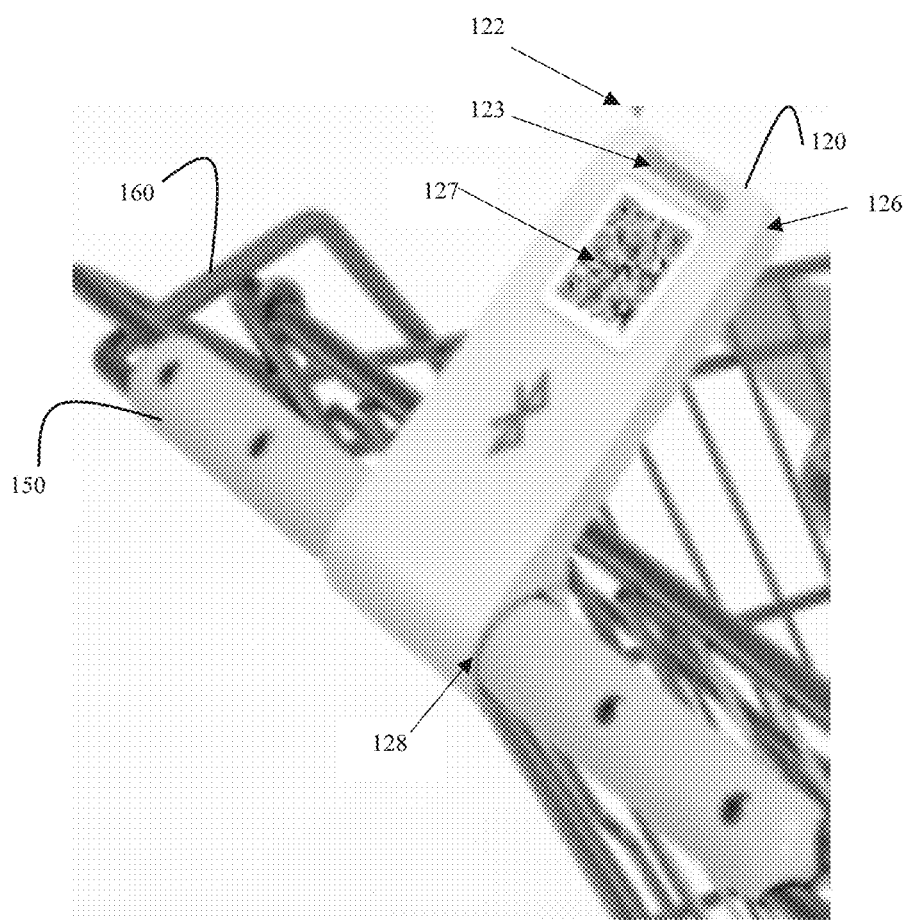
FIG. 1B is a diagram of a portable scan-assistance device affixed to a handle of a cart, according to an example embodiment.

FIG. 1B is a diagram of externally visible components of a portable scan-assistance device 120 affixed to a handle 150 of a shopping cart 160, according to an example embodiment.

Portable scan-assistance device 120 further comprises a housing 126 and a QR label 127 affixed to a front-facing surface of the housing 126. A top edge of the housing above the QR label 127 the status light 123 or status lights 123 are visible in a rectangular formation. An opening in the housing 126 permits visibility to a front area of the front surface of the housing 126 for the image sensor 122. An opposite end of the housing 126 comprises a latching or affixing mechanism/means 128.

Mechanism 128 permits portable scan-assistance device 120 to be clipped or fastened onto a cart handle 150 of a cart 160. In an embodiment, mechanism 128 is manufactured into the housing 126 as a component of the housing, the mechanism 128 forms a partial circle in a tube shape that is stretchable, such that the mechanism 128 can be stretched to fit over and latch onto handle 150.

In an embodiment, mechanism 128 may be detachable from housing 126, such as a two-way clip that clips to one end of the housing 126 and clips to another object, such as a bag, a purse, a basket, shopping scooter, or the cart 160.

In an embodiment, mechanism 128 is a chain that fits through a manufactured hole or loop in housing 126, such that the chain with the portable scan-assistance device 120 can be worn as a necklace or a watch around the customer's neck or wrist.

In an embodiment, mechanism 128 is Velcro straps rather than clips.

Portable scan-assistance device 120 when affixed to a cart 160, basket, shopping scooter, bag, or worn by the customer includes an opening that exposes the image sensor 122. Image sensor 122 looks for item barcodes of items placed in front of portable scan-assistance device 120.

With the physical features and attributes of portable scan-assistance device 120 discussed, a workflow for a shopping trip of a customer within a store is now discussed within the context of system 100.

Initially, a customer acquires a portable scan-assistance device 120. This may be as a wearable item, an attachable item to a cart, basket, bag, shopping scooter, or purse, or an item already affixed to a cart 160, shopping scooter, or a basket of the store.

The customer obtains their device 130 (such as their phone) opens their retail app 137. The user-facing interface includes an option to connect to a portable scan-assistance device 120. When the customer selects this option, pair agent is activated. There are two primarily mechanisms by which the customer can connect and establish a communication session between their device 130 and portable scan-assistance device.

In a first option, when the user selects the connection option within the user-facing interface of retail app 137, the camera 132 is activated on device 130. The customer points the camera's focus at the OR label 127 of portable scan-assistance device 120. Pair agent 136 then interacts with wireless transceiver 134 and pair/transfer/status manager 126 and wireless transceiver 124 to make a wireless connection 140 between portable scan-assistance device 120 and customer device 130. This wireless connection 140 is a Bluetooth® Low Energy (LE) wireless connection between the portable scan-assistance device 120 and the customer device 130. Here, transceivers 135 and 124 are Bluetooth® wireless transceivers.

In a second option, when the user selects the connection option within the user-facing interface of retail app 137, pair agent 136 interacts with wireless transceiver 135, pair/transfer/status manager 126, and wireless transceiver 124 to connect portable scan-assistance device 120 to customer device 130 over a wireless connection 140 when the customer taps device 130 on portable scan-assistance device 120. This wireless connection 140 is a Near Field Communication (NFC) connection between the portable scan-assistance device 120 and customer device 130. Here transceivers 135 and 124 are NFC wireless transceivers.

In an embodiment, both customer device 130 and portable scan-assistance device 120 comprises two wireless transceivers 134, one for Bluetooth® and one for NFC, such that the customer can make the initial wireless connection 140 utilizing Bluetooth or utilizing NFC.

Once wireless connection 140 is established between customer device 130 and portable scan-assistance device 120, image sensor 122 begins to look for item barcodes placed by the customer in the field of view of image sensor 122. The customer may also put their device 130 away for the remaining of the shopping trip (or at least until checkout). The device 130 may be put in a pocket or bag of the customer during the shopping trip while connection 140 remains active during the shopping trip. Device 130 is not needed during the shopping trip after connection 140 for the customer to complete their shopping trip. Although it is noted that the customer may voluntarily operate device 130 for purposes of seeing what is scanned and what is in the customer's virtual cart at any point in time desired by the customer.

Image sensor 122 obtains an image of the item barcode placed in its field of view and it is passed over connection 140 to retail app 137 (retail app 137 remains active on device 130 during the shopping trip even if the customer has device 130 put away in a bag or pocket during the shopping trip). App 137 obtains the item details for the item code passed to it over connection 140 interacts with transaction manager 113 for purposes of updating the virtual cart of the customer and obtaining item information and pricing which is returned back to app 137 for viewing by the customer (if desired).

This continues until the customer is finished with the shopping trip and is ready to checkout (pay for the items in the virtual shopping cart). Payment can be achieved in a variety of manners. In one example, the customer simply exits the store and overhead tracking cameras detect that action as an intent to pay. Transaction manager 113 obtains a registered payment card for the customer and processes payment to complete the checkout. In another example, app 137 displays a barcode for the virtual card on the touch display 133 of device 130 when the customer activates an option within a user-facing interface of app 137 indicating that the customer is ready to pay. The customer then places the touch display 133 with the barcode under a scanner of a Self-Service Terminal (SST) or under a Point-Of-Sale POS terminal. This causes transaction manager 113 to recall the virtual cart with its items, item descriptions, and pricing to be displayed on a display of the SST or POS and the customer proceeds through the payment processing to complete the checkout. In still another example, the customer can pay via the payment screens through the retail app 137 by activating a payment option on the device 130.

Pair/Transfer/Status manager 126 also controls status light 123 during operation. For example, when a successful connection is made between customer device 130 and portable scan-assistance device 120, pair/transfer/status manager 126 illuminates the status light a color blue (indicating connection 140 is active). When an item code is not captured successfully by image sensor 122, the light is changed to a color red. When the item code is captured successfully by image sensor 122, the light is changed to a color green. The status light may be a solid red color when there is no connection 140. Moreover, in an embodiment, when pair/transfer/status manager 126 detects a low battery level for portable scan-assistance device 120, the light may blink red, which is an indicating to staff that the portable scan-assistance device 120 should have the batteries replaced or should be charged. In fact, any combination of light colors or light effects (long blinks, short blinks, solid and unblinking, etc.) may be used to indicate various statuses of a given shopping session or when there is no shopping session. Pair/Transfer/Status manager 126 controls and can be configured to unique create color illuminations or effects (blinks at different rates) based on the statuses.

When retail app 137 detects that the customer has paid for the virtual cart of items through a message sent by transaction manager 113, app 137 terminates the wireless connection 140. Pair/Transfer/Status manager 126 then changes the status light 123 to a solid red color as an indication that there is no longer a customer shopping session and there is no longer any wireless connection 140.

Portable scan-assistance device 120 only requires a minimum amount of hardware and software. The software 126 may be firmware that establishes connection 140 with device 130, controls status light 123 based on statuses (no connection, connection, successful item code read, unsuccessful item code read, connection terminated, etc.), and passes read item codes over connection 140 to app 137. Thus, portable scan-assistance device 120 is inexpensive to manufacturer and maintain. Furthermore, portable scan-assistance device 120 is portable such that it is not tied to any given cart, basket, shopping scooter or bag and can be reused with multiple carts, baskets, shopping scooters, and bags.

In an embodiment, software 126 (pair/transfer/status manager 126) may comprise storage that collect metrics, such as items scanned; time of day, day of week, and calendar day of scan; time spent scanning; time spent per shopping session (based on time of wireless connection 140); total number of bad scans or unsuccessful scans; etc. Device 120 may permit two modes of operation one for administrative and one for shopping. During administrative operation, the collected metrics can be obtained from storage for analysis.

In an embodiment, device 120 is a passthrough, intermediate, or proxy to customer device 130 for purposes of passing item codes during a shopping trip to app 137 for recording in a virtual shopping cart for the customer with transaction manager 113.

A customer is not required to operate their device 130 during a shopping trip with system 100 and can shop freely with two hands with portable scan-assistance device 120. Furthermore, the software required for mobile shopping remains on the customer's device 130 as app 137, such that the retailer can distribute, maintain, update, and upgrade app 137 remotely via a cellular or Wi-Fi connection to device 130. Moreover, there is no expensive hardware to maintain on portable scan-assistance device 120 as all that is required is a non-powerful or cheap processor 121, an inexpensive image sensor 122, an inexpensive wireless transceiver 124, an inexpensive LED status light 123, and non-complex firmware 126.

In an embodiment, portable scan-assistance device 120 is detachable and reattach able device that can be affixed to carts, bags, baskets, shopping scooters, or worn by a customer (necklace, watch, or clipped onto a belt loop, clothing, a hat, or other clothing of the customer).

In an embodiment, customer device 130 is a phone, a tablet, or a wearable processing device (watch, glasses, etc.).

In an embodiment, retail server 110 is one of several servers that logically cooperate as one server in a cloud environment (cloud).

Figure 2:
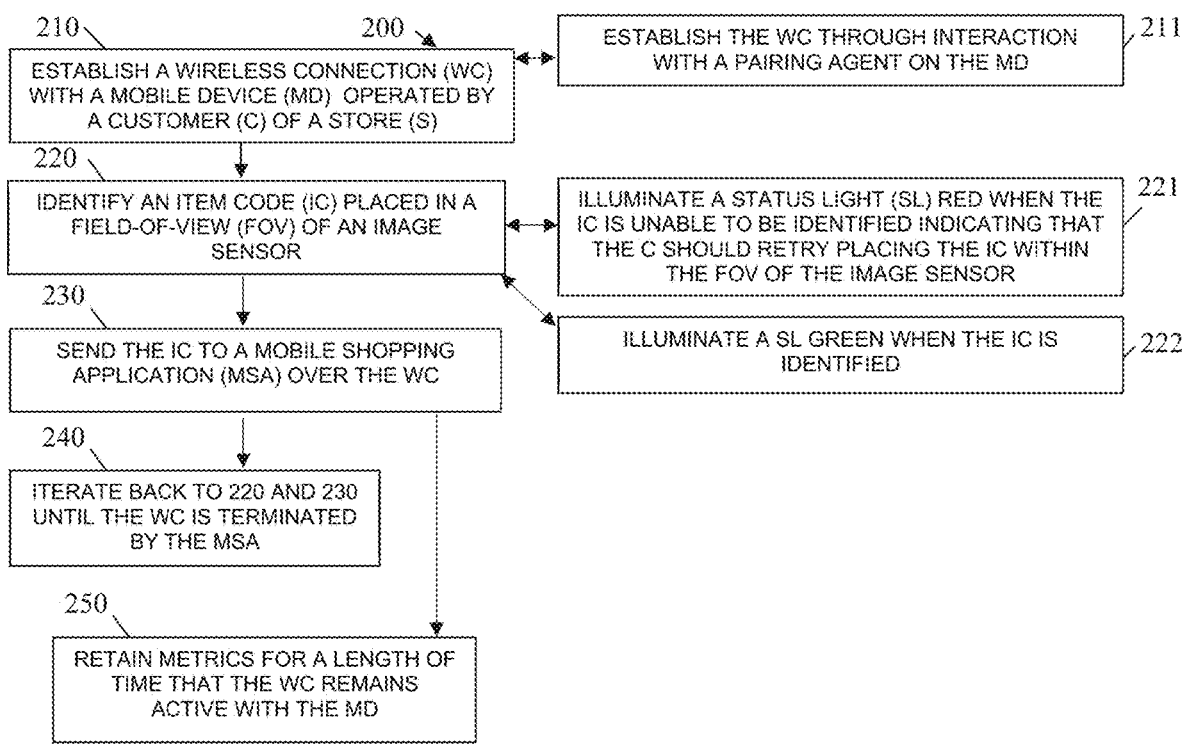
FIG. 2 is a diagram of a method for operating a portable scan-assistance device while shopping, according to an example embodiment.

The above-referenced embodiments and other embodiments are now discussed with FIG. 2.

FIG. 2 is a diagram of a method 200 for operating a portable scan-assistance device during a customer shopping trip within a store, according to an example embodiment. The software module(s) that implements the method 200 is referred to as a "portable scan assistant." The portable scan assistant is implemented as executable instructions programmed and residing within memory and/or a non-transitory computer-readable (processor-readable) storage medium and executed by one or more processors of a device. The processor(s) of the device that executes the portable scan assistant are specifically configured and programmed to process the portable scan assistant. The portable scan assistant may have access to one or more network connections during its processing. The network connections can be wired, wireless, or a combination of wired and wireless.

In an embodiment, the device that executes the portable scan assistant is device 120 (as discussed in system 100 of FIG. 1A and FIG. 1B).

In an embodiment, the portable scan assistant is all or some combination of 125.

At 210, the portable scan assistant establishes a wireless connection 140 with a mobile device 130 operated by a customer of a store.

In an embodiment, at 211, the portable scan assistant establishes the wireless connection 140 through interaction with a pairing agent 136 on the mobile device 130.

In an embodiment, the wireless connection 140 is an NFC established connection.

In an embodiment, the wireless connection 140 is a Bluetooth® LE connection.

At 220, the portable scan assistant identifies an item code placed in a field-of-view of an image sensor 122.

In an embodiment, at 221, the portable scan assistant illuminates a status light 123 red when the item code is unable to be identified indicating that the customer should retry placing the item code within the field-of-view of the image sensor 122.

In an embodiment, at 222, the portable scan assistant illuminates a status light 123 green when the item code is identified/captured by the image sensor 122.

At 230, the portable scan assistant sends the item code a mobile shopping application 137 over the wireless connection 140.

In an embodiment, at 240, the portable scan assistant iterates back to 220 and 230 until the wireless connection is terminated by the mobile shopping application 137 indicating that the customer's shopping trip has entered or completed payment with transaction manager 113.

In an embodiment, at 250, the portable scan assistant retains metrics for a length of time that the wireless connection 140 remains active with the mobile device 130.

One now appreciates how a portable device 120 with minimal hardware and processing capabilities can serve as an extension to or an add on device to a mobile device 130 of a customer during a shopping trip at a store. The portable device 120 acts as a wireless scanner or wireless peripheral device of the mobile device 130 during the shopping trip. This permits the customer to use two hands to handle items while shopping and populating item entries in their virtual shopping cart.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A device, comprising:
   a status light;
   a wireless transceiver;
   an image sensor;
   a processor;
   non-transitory computer-readable storage medium comprising executable instructions; and
   the executable instructions when executed by the processor cause the processor to perform operations comprising:
   establishing a wireless connection with a mobile device operated by a customer, wherein the device and the mobile device establish the wireless connection to one another when an application executing on the mobile device scans a quick response (QR) code affixed to the device;
   relaying item codes captured by the image sensor of the device to the mobile device over the wireless connection, wherein the application forwards the item codes to a server after receiving the item codes from the device over the wireless connection; and
   controlling illumination of the status light based on statuses associated with the wireless connection and the image sensor, wherein after the wireless connection is established with the mobile device, the mobile device automatically forwards the item codes to the server even when the mobile device is not being operated by the customer;
   wherein controlling further includes changing the status light from no illumination to a green color when a successful item code status is reported by the image sensor;
   wherein the device is a passthrough, intermediate, or proxy to the mobile device for purposes of passing item codes during a shopping trip to the application for recording in a virtual shopping cart for the customer with a transaction manager.

2. The device of claim 1 further comprising, a latching mechanism to attach and detach a housing of the device to objects.

3. The device of claim 2, wherein objects comprise, carts, baskets, bags, clothing, a shopping scooter, or body parts of an individual.

4. The device of claim 1 further comprising, a chain that fits through a hole in a housing of the device and is adapted to be affixed around a neck of an individual or to be placed over a head of the individual with the device worn as a necklace.

5. The device of claim 1 further comprising, the QR code affixed as a label to a front surface of a housing of the device.

6. The device of claim 1, wherein the executable instructions when executed by the processor cause the processor to perform additional operations comprising:
   capturing metrics for the item codes, length of time associated with the wireless connection, and the statuses;
   storing the metrics in storage of the device.

7. The device of claim 6, wherein the executable instructions when executed by the processor cause the processor to perform further operations comprising:
   detecting an administrative mode of operation; and
   providing the metrics from the storage.

8. The device of claim 1, wherein the executable instructions associated with the controlling further cause the processor to perform additional operations comprising:
   changing colors of the status light based on the statuses.

9. The device of claim 1, wherein the executable instructions associated with the controlling further cause the processor to perform additional operations comprising:
   changing a blink rate associated with an illuminated color of the status light based on a particular status.

10. The device of claim 1, wherein the executable instructions associated with the controlling further cause the processor to perform additional operations comprising:

changing the status light from illuminating a first color to a second color when a connection status indicates that the wireless connection is established.

11. The device of claim 1, wherein the executable instructions associated with the controlling further cause the processor to perform further operations comprising:
changing the status light from no illumination to a red color when an unsuccessful item code status is reported by the image sensor.

12. A method, comprising:
establishing a wireless connection with a mobile device operated by a customer of a store when the mobile device scans a quick response (QR) code associated with a device executing the method;
identifying an item code placed in a field-of-view of an image sensor; and
sending the item code to a mobile shopping application over the wireless connection, wherein the mobile shopping application forwards the item code to a server after receiving the item code from the device executing the method;
wherein a customer-specific virtual cart is updated;
wherein after the wireless connection is established with the mobile device, the mobile application of the mobile device automatically forwards the item code to the server even when the mobile device is not being operated by the customer;
wherein the device executing the method requires only a minimum amount of hardware and software, wherein the software is firmware that establishes the wireless connection with the mobile device, controls a status light based on statuses, and passes read item codes over the wireless connection to the mobile shopping application.

13. The method of claim 12, wherein establishing further includes establishing the wireless connection through interaction with a pairing agent on the mobile device.

14. The method of claim 12, wherein identifying further includes illuminating a status light red when the item code is unable to be identified indicating that the customer should retry placing the item code within the field-of-view of the image sensor.

15. The method of claim 12, wherein identifying further includes illuminating a status light green when the item code is identified.

16. The method of claim 12 further comprising, iterating the identifying and the sending until the wireless connection is terminated by the mobile shopping application.

17. The method of claim 12 further comprising, retaining metrics for a length of time that the wireless connection remains active with the mobile device.

18. A system, comprising:
at least one server;
a portable scan-assistance device; and
a mobile device operated by a customer of a store;
wherein the mobile device is configured to process a mobile shopping application to interact with a transaction manager of the at least one server for a shopping trip of the customer at the store, to establish a wireless connection to the portable scan-assistance device when the mobile device scans a quick response (QR) code associated with the portable scan-assistance device, to receive item codes captured by an image sensor of the portable scan-assistance device, and to pass and forward the item codes from the mobile shopping application to the transaction manager of the at least one server to record items in a virtual cart of the customer for the shopping trip, wherein after the wireless connection is established with the mobile device, the mobile shopping application of the mobile device automatically forwards the item code to the at least one server even when the mobile device and mobile shopping application are not being operated by the customer;
wherein the at least one server is configured to interact with the mobile application, to lookup the item codes, and to maintain the virtual shopping cart for the customer during the shopping trip;
wherein the portable scan-assistance device is configured to establish the wireless connection with a pairing agent of the mobile device when the mobile device scans the QR code associated with the portable scan-assistance device, to capture, via an image sensor, the item codes, to illuminate a status light when the item codes are captured, to pass the item codes to the mobile application over the wireless connection, and to retain metrics associated with a length of time of the wireless connection and successful and unsuccessful capturing of the item codes;
wherein the portable scan-assistance device is further configured to change the status light from no illumination to a green color when a successful item code status is reported by the image sensor;
wherein the portable scan-assistance device comprises a non-powerful processor, an image sensor, a wireless transceiver, an LED status light, and firmware as software.

19. The system of claim 18, wherein the portable scan-assistance device is further configured to control one or more of a color and a blink rate of the status light based on the wireless connection and the successful and the unsuccessful capturing of the item codes.

* * * * *